United States Patent [19]

Kamler et al.

[11] Patent Number: 5,000,470

[45] Date of Patent: Mar. 19, 1991

[54] BICYCLE HAVING REAR SHOCK ABSORBING ARRANGEMENT AND IMPROVED SHOCK ABSORBER FOR BICYCLES

[75] Inventors: Arnold Kamler, Pine Brook; Sylvester Yen, South Orange, both of N.J.

[73] Assignee: Kent International, Inc., Kearny, N.J.

[21] Appl. No.: 384,316

[22] Filed: Jul. 24, 1989

[51] Int. Cl.⁵ .............................................. B62K 25/10
[52] U.S. Cl. ..................................... 280/275; 280/284
[58] Field of Search ...................... 280/281.1, 282, 283, 280/284, 285, 286, 288; 267/170, 178, 289, 290

[56] References Cited

U.S. PATENT DOCUMENTS

| | | | |
|---|---|---|---|
| 721,343 | 2/1908 | Travis | 280/284 |
| 2,202,050 | 5/1939 | Gibbons | 267/289 |
| 2,687,898 | 8/1954 | Schwinn | 280/276 |
| 3,753,578 | 8/1973 | Rupp, II | 280/284 |

FOREIGN PATENT DOCUMENTS

| | | | |
|---|---|---|---|
| 366977 | 4/1939 | Italy | 280/284 |
| 24533 | 2/1896 | United Kingdom | |
| 16415 | 7/1903 | United Kingdom | 280/283 |

Primary Examiner—Charles A. Marmor
Assistant Examiner—Victor E. Johnson
Attorney, Agent, or Firm—Kenyon & Kenyon

[57] ABSTRACT

The invention provides a bicycle having an improved shock absorbing suspension system and an improved shock absorber for a bicycle. The suspension system comprises a single pair of improved shock absorbers associated with the rear wheel of the bicycle. The improved shock absorber comprises an elongated housing having a hollow cylindrical core which receives a shock absorber rod having a piston head. The core of said housing is provided with a multiplicity of longitudinally disposed shock absorbing springs arranged end to end between the closed end of the housing and the piston head. The springs possess different innate resistances to compression so that the shock absorber has a varying shock absorbing capacity. A return spring is lodged in the housing core on the opposite side of the piston head between the piston head and the end of the housing which receives the shock absorber rod. The return spring provides resistance against the piston head as it moves toward the receiving end of the housing to prevent backlash of the shock absorber rod.

22 Claims, 3 Drawing Sheets

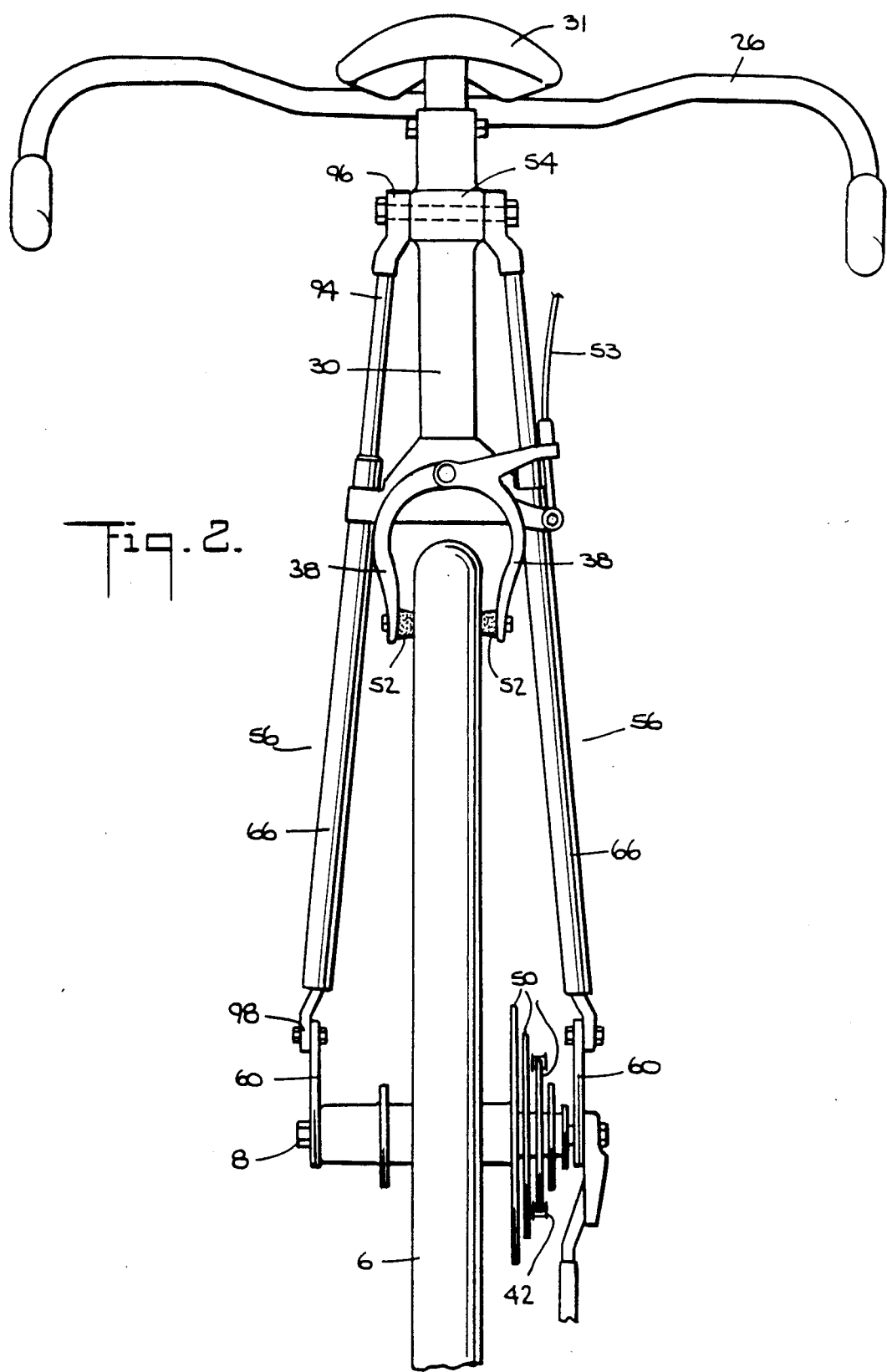

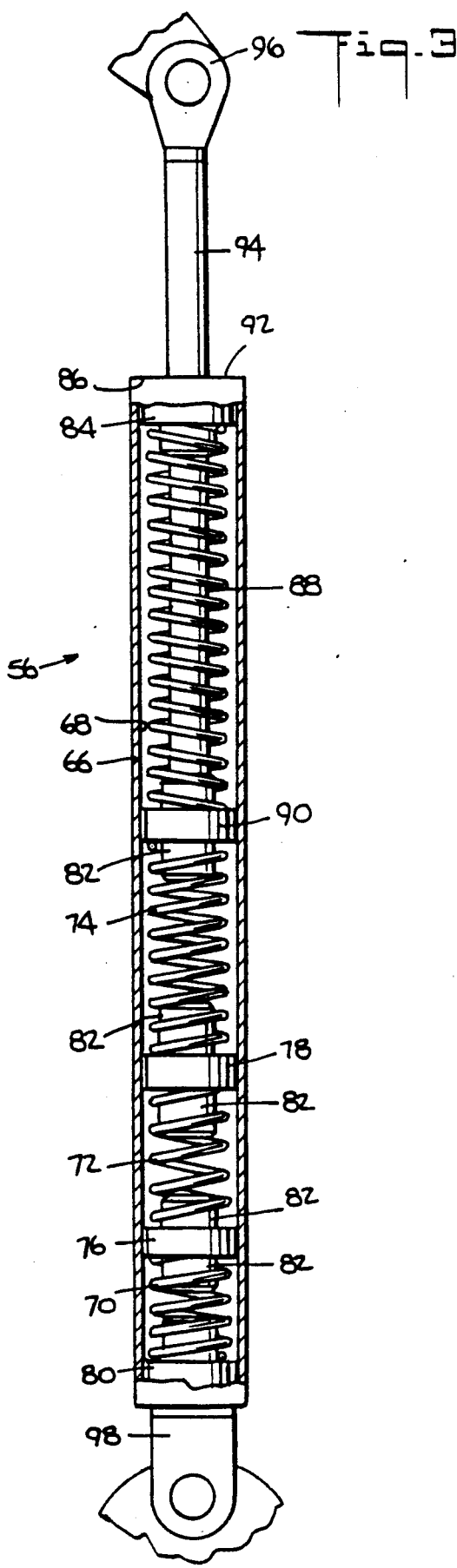
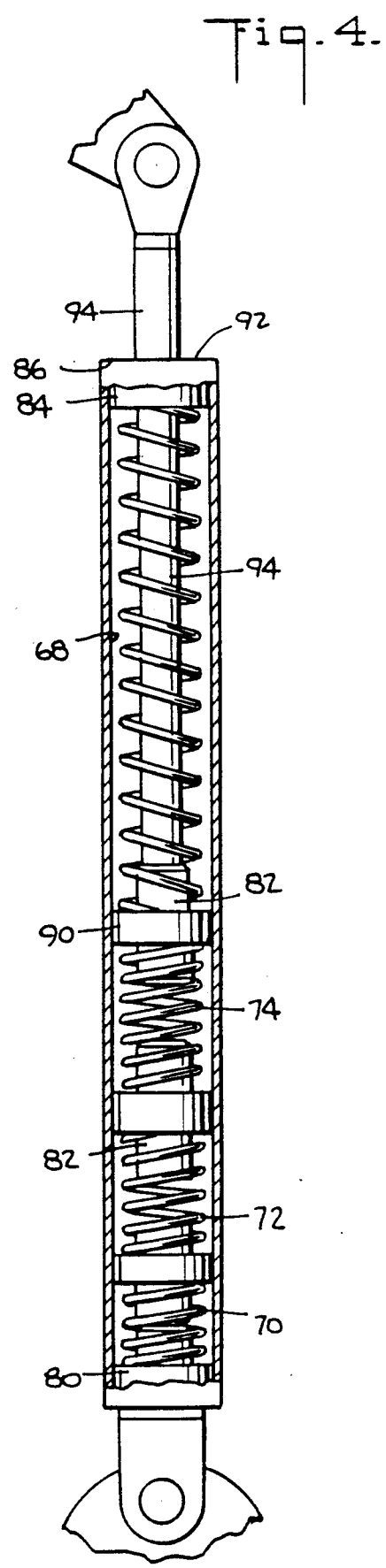

BICYCLE HAVING REAR SHOCK ABSORBING ARRANGEMENT AND IMPROVED SHOCK ABSORBER FOR BICYCLES

FIELD OF THE INVENTION

The present invention relates to bicycles having a shock absorbing suspension system. The invention further relates to shock absorbers for bicycles, especially adult bicycles.

BACKGROUND OF THE INVENTION

Bicycle riding has always been a popular recreational activity among children. However, due to an increasing public awareness of the benefits of aerobic exercise, bicycle riding is quickly becoming a popular pastime among adults as a way of achieving physical fitness and better health. Recent statistical surveys have shown that increasingly large numbers of bicycles are now being purchased for use by people over the age of 45.

In response to the increasing consumer demand for bicycles for use by adults, a recent focus of bicycle manufacturers has been to design and market bicycles which are particularly tailored to meet the wants and needs of adults. Surveys reveal that one of the primary considerations of adult bicycle purchasers is the overall comfort of the bike. The adult bicycle market is dominated by lightweight touring type bicycles which are generally perceived by adult purchasers as offering a more comfortable ride than other types of bicycles. However, there is a need to provide touring type bicycles in which the comfort and smoothness of the ride is enhanced in order to further meet the wants of adult riders.

Bicycles having shock absorbers have been previously manufactured. These bicycles were designed to closely resemble motorcycles so as to target the children's market. Accordingly, the bikes were equipped with a pair of heavy-duty type shock absorbers on both the front and rear wheels to give the bike the appearance of a motorcycle. The four shock absorbers were designed to provide a heavy duty suspension system to simulate the choppy rough ride of a motorcycle. However, this type of heavy duty suspension system is not suitable for an adult's bicycle wherein the comfort and smoothness of the ride are important features.

Accordingly, it is an object of the invention to provide a bicycle having a shock absorbing suspension which provides a smooth and comfortable ride.

It is a further object of the invention to provide an adult bicycle having a shock absorbing suspension associated with the seat and rear wheel of the bike.

It is another object of the invention to provide an improved shock absorber for use in a bicycle.

It is a further object of the invention to provide a shock absorber having a multiplicity of resistances.

SUMMARY OF THE INVENTION

The foregoing objects of the invention are achieved by providing a bicycle having a shock absorbing suspension system associated with the rear wheel, the suspension system comprising a single pair of shock absorbers, each shock absorber being fixedly attached at one end thereof to a seat mast of the bicycle frame and at the other end thereof to separate prongs of a two prong lower fork of the bicycle frame, each prong of said lower fork being attached at one end thereof to opposite ends of a rear wheel axle such that the rear wheel axle remains free to rotate, the other end of each prong being pivotably attached to a pivot bolt, the pivot bolt being fixedly housed in a pivot bolt housing, and the seat mast being fixedly attached near its bottom end to said pivot bolt housing, whereby said lower fork is free to pivot about said pivot bolt in response to compression and expansion of said shock absorbers.

The invention also provides an improved shock absorber for use in the bicycle comprising an elongated housing having a hollow cylindrical core, said housing having a closed end and an opening at the other end thereof which receives a shock absorber rod having a piston head, said shock absorber rod piston head being capable of sliding longitudinal movement within said housing core. The core of said housing is provided with a multiplicity of longitudinally disposed shock absorbing springs arranged end to end between the closed end of the housing and the piston head. The shock absorbing springs are capable of longitudinal compression movement within the core in response to movement of said piston head toward the closed end of the housing so as to provide opposing resistance against the piston head. A return spring is lodged in the housing core on the opposite side of the piston head between the piston head and the end of the housing which receives the shock absorber rod ("receiving end"). The return spring provides resistance against the piston head as it moves toward the receiving end of the housing to prevent backlash of the shock absorber rod. At least two of the shock absorbing springs possess different innate resistances to compression so that the shock absorber can absorb shocks of various intensities. Preferably, the return spring is long enough so that it is compressed within the housing core regardless of the extent to which the shock absorber rod is pushed into the housing.

DESCRIPTION OF THE DRAWINGS

FIG. 2 depicts a more detailed view of the rear shock absorbing suspension of the bicycle depicted in FIG. 1;

FIG. 3 depicts a shock absorber in accordance with the invention which is in a state of equilibrium; and FIG. 4 depicts a shock absorber in accordance with the invention which is being acted upon by an outside force.

DETAILED DESCRIPTION OF THE INVENTION

Figure 1:
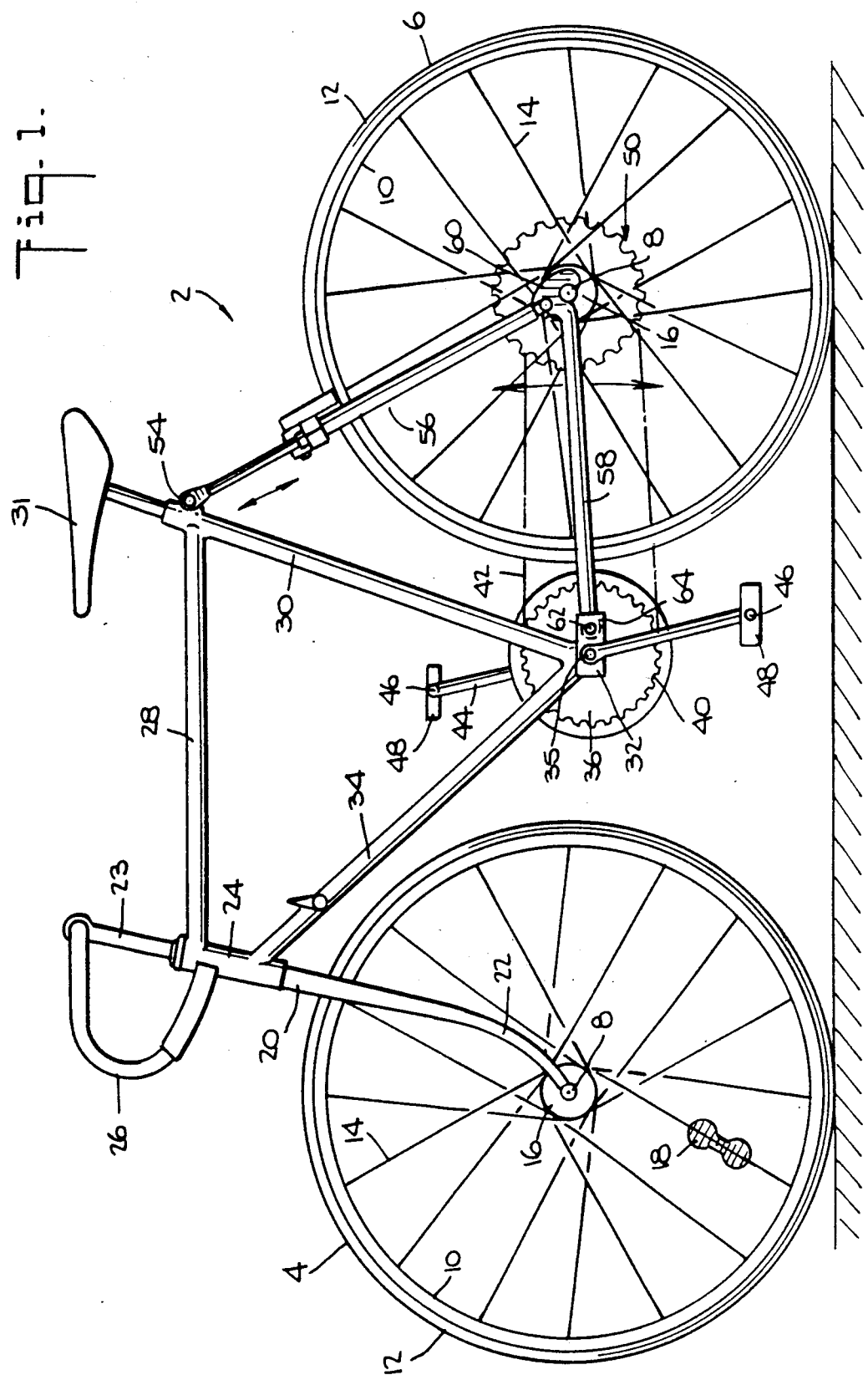
FIG. 1 depicts a bicycle having a rear shock absorbing suspension in accordance with the invention.

The bicycle of the present invention 2 includes a pair of wheels 4, 6 arranged in tandem. Each wheel has an axle 8 for supporting rotation thereof. Each wheel includes a rim 10 for supporting a bicycle tire 12 around the periphery thereof. Axles 8 are supported in a fixed position in the center of each wheel by a multiplicity of spokes 14 which join the inner periphery of rim 10 with a pair of axle rings 16. Axle rings 16 are circumferentially disposed around the periphery of axle 8 at or near opposite ends thereof. One or more light reflectors 18 may be attached to spokes 14 to adapt the bicycle for night riding. It should be appreciated that other conventional bicycle wheel arrangements can also be employed in the practice of the invention.

Bicycle 2 includes a front fork 20 comprised of a pair of prongs 22 which are disposed on opposite sides of front wheel 4. The lower end of each prong 22 is rotatably attached to axle 8. Prongs 22 converge at the upper end of front fork 20 to join a vertically disposed handle bar attachment member 23 The top end of attachment member 23 supports a set of laterally disposed handle bars 26 which allow a rider to turn front wheel 4. A hollow cylindrical head bar 24 is concentrically disposed around attachment member 23. Head bar 24 allows for rotational movement of attachment member 23 as handle bars 26 are turned. Head bar 24 is rotatably supported on the top of the convergence point of prongs 22 of front fork 20 so as to allow for turning of the front fork as handle bars 26 are turned.

Bicycle 2 includes a top bar 28 which is generally parallel to an imaginary line connecting the center of the axles 8 of the front and rear wheels 4 and 6. The front end of top bar 28 is fixedly attached to head bar 24. The rear end of top bar 28 is fixedly attached to a generally vertically disposed seat mast 30 near the top end thereof. Seat mast 30 supports a seat 31 at the top thereof. Preferably the top bar and the seat mast form an interior angle at their point of connection of between 45° and 135° and most preferably about 80°. The bottom end of seat mast 30 is fixedly attached to a gear axle housing 32. A down bar 34 is fixedly attached at its rear end to gear axle housing 32 and at its front end to head bar 24. Head bar 24, top bar 28, seat mast 30, down bar 34 and gear axle housing 32 are preferably welded at their points of attachment to provide a sturdy bicycle frame.

A gear axle 35 is rotatably positioned within gear axle housing 32. A pedal gear 36 is concentrically disposed around gear axle 35 and is joined for rotational movement therewith. Pedal gear 36 has a multiplicity of teeth 40 around the periphery thereof for releasable engagement with a bicycle chain 42.

Bicycle 2 is provided with a conventional leveraged means for rotating pedal gear 36. Each end of gear axle 35 is fixedly attached at a substantially perpendicular angle to the end of a pedal lever 44 so that the pedal levers 44 extend in opposite directions. The other end of each pedal lever 44 is fixedly attached to a laterally disposed pedal axle 46. A pedal 48 is rotatably attached to each pedal axle 46.

At least one rear gear 50 is concentrically disposed around axle 8 of rear wheel 6. As known to those skilled to the art, rear gear 50 may be connected to axle 8 by conventional ratchet means (not depicted) such that rotation of gear 50 in the forward direction urges axle 8 to rotate in the same direction but such that axle 8 is free to rotate separately from gear 50. Rear gear 50 also includes a multiplicity of teeth around its periphery for releasable engagement with bicycle chain 42. Bicycle chain 42 is snugly wrapped around the teeth of gears 36 and 50 so as to couple the gears for rotational movement as pedal gear 36 is rotated. As will be appreciated by those of ordinary skill in the art, other conventional gear means for causing rotation of the bicycle wheel(s) are available and can be employed in the bicycle of the invention. For example, the bike can include a multiplicity of rear gears (see FIG. 2) of varying diameters so as to provide more than one tension or work efficiency for pedaling the bike. No particular gear arrangement is necessary to practice the invention.

The novel integral shock absorbing suspension arrangement of bicycle 2 will now be described. Seat mast 30 is provided with a bracket 54 near the top end thereof (see FIG. 2). A pair of shock absorbers 56 extend longitudinally along opposite sides of rear wheel 6.

Shock absorbers 56 are fixedly attached at their upper end to opposite sides of bracket 54. Bicycle 2 includes a pair of lower fork prongs 58 disposed on opposite sides of rear wheel 6. The rear end of each lower fork prong is rotatably attached to opposite ends of axle 8 of rear wheel 6 so as to permit rotation of rear wheel 6. An upward extension 60 of each lower fork prong 58, disposed near the point of attachment of prong 58 to axle 8, serves as a point of fixed attachment for the lower end of shock absorbers 56. It is preferred that shock absorbers 56 form interior angles of 35°-65° with lower fork prongs 56 and also with seat mast 30 and that seat mast 30 form an angle of 50°-110° with said lower fork. It is most preferred that each of these angles be approximately 45°-55° and 70°-90°, respectively.

Lower fork prongs 58 are rotatably attached at their front end to pivot bolt 62 so as to be pivotable about bolt 62 (see FIG. 1). Lower fork prongs 58 are preferably joined by means of a cross bar (not depicted), at some point to the outside of rear wheel 6, so that they pivot in unison. Axle 8 of rear wheel 6 also forces prongs 58 to pivot in unison. Pivot bolt 62 is fixedly attached within a rear hollow extension 64 of gear axle housing 32.

The bicycle also includes braking means for arresting motion of the bicycle. Any conventional braking means known to those skilled in the art can be employed in the bicycle of the invention. For example, a typical braking means can include a pair of brake pads 52 positioned on opposite sides of rim 10 of each wheel (see FIG. 2). The brake pads are supported for inward movement on brake shoes 38 to engage rim 10 in response to movements of a cable system 53. The cable system is responsive to gripping means (not depicted) positioned on handle bars 26.

The action of the shock absorbing suspension of the bicycle of the invention can be seen as follows. As bicycle 2 is pedaled over a bump in the road, rear wheel 6 is urged upward thereby imparting a torque to the lower fork prongs 58. In the case of an inflexible conventional bicycle, the shock wave which is generated as a result of contact with the bump is transmitted by the bicycle to the rider who ultimately absorbs it. However, in the case of the present invention, rear wheel 6 and lower fork prongs 58 are free to pivot upward about pivot bolt 62. When this happens, shock absorbers 56 become compressed in absorbing the shock. The force urging rear wheel 6 upward is counterbalanced by an opposing force generated by the compressed shock absorbers. As the rear wheel passes over the bump and onto level ground, the force of the compressed shock absorbers urges rear wheel 6 downward. Rear wheel 6 is free to pivot downward by means of the lower fork prongs 58 about pivot bolt 62 allowing shock absorbers 56 to return to their state of equilibrium.

The type of shock absorber used in the bicycle of the present invention is not critical. Conventional air or spring shock absorbers can be used provided that the shock absorbing suspension of the bicycle is arranged as described herein. Nevertheless, the invention also provides an improved shock absorber which is especially adapted for use in an adult bicycle.

Referring to FIG. 3, a shock absorber 56 in accordance with the invention is generally depicted. Shock absorber 56 includes a cylindrical spring housing 66 having a hollow tubular core. The inner surface of housing 66 is preferably lined with a soundproof layer 68 to reduce the noise which is emanated during the functioning of the shock absorber. Longitudinally disposed in end to end arrangement within housing 66 are energy absorbing springs 70, 72 and 74. Energy absorbing springs 70, 72 and 74 possess different innate resistances (or spring constants) such that a different force is required to compress each spring. Preferably, spring 70 has the smallest spring constant of the energy absorbing springs and spring 74 has the highest. Springs 72 and 74 are supported for longitudinal movement and compression within housing 66 on bearings 76 and 78, respectively. The diameter of bearings 76 and 78 must be such that they are slidable within housing 66 in the longitudinal direction and yet act as an unpassable movable boundary between the energy absorbing springs. Energy absorbing spring 70 is supported by a closed end wall 80 of housing 66. The other end of housing 66 shall be referred to as the rod receiving end 92. Preferably, bearings 76 and 78 are provided with cylindrical longitudinal extensions 82 on their upper and lower surfaces. Cylindrical extensions 82 have a smaller diameter than bearings 76 and 78 and energy absorbing springs 70, 72 and 74 such that they extend longitudinally into the energy absorbing springs. The diameter of the cylindrical extensions 82 should be just slightly less than the diameter of the energy absorbing springs 70, 72 and 74 such that they serve as a guide means for the springs during compression thereof. It is also preferred that the diameter of the energy absorbing springs be just slightly less than the inner diameter of the tubular core of housing 66. In this way, the cylindrical extensions 82, in conjunction with the inner surface of housing 66, function to restrict lateral movement of the energy absorbing springs during compression to provide for greater stability of the springs.

Housing 66 also contains a return spring 88 which is longitudinally disposed between an inner rim 86 of the rod entrance end of housing 66 and energy absorbing spring 74. Piston head 90 is interposed between return spring 88 and energy absorbing spring 74 and functions in the same way as bearings 76 and 78 to serve as a movable yet unpassable boundary between springs 74 and 88. Return spring 88 is supported for longitudinal expansion within housing 66 by piston head 90. Piston head 90 may also be provided with cylindrical extensions 82 for stabilizing springs 74 and 88 in the manner previously described.

The inner rim 86 of the rod receiving end 92 of housing 66 defines an aperture for receiving shock absorber rod 94. Rod 94 extends from a connection end located outside of housing 66 to an interior end where it meets and joins an extension 82 of piston head 90. The diameter of rod 94 is less than the diameter of return spring 88 so that rod 94 is longitudinally slidable therethrough. Preferably, housing 66 is provided with a plug 84 which is contiguous with the inner rim 86 of receiving end 92 and which has an aperture having a diameter which is just slightly greater than the diameter of the shock absorber rod 94 to restrict lateral movement of rod 94. The connection end of rod 94 which is located outside of housing 66 is provided with a connection plate 96 for attachment to bracket 54 of bicycle 2. The outside of end wall 80 of housing 66 is also provided with a connection plate 98 for attachment to lower fork prong 58 of bicycle 2.

The length of shock absorber 56 between connection plates 96 and 98 should be such that in their state of equilibrium they fit to connect bracket 54 and lower fork prong 58 of bicycle 2 in the manner described above. As used herein, the expression "state of equilibrium" means the state in which the shock absorber rod 94 remains in a fixed position with respect to spring housing 66 when the shock absorber is not acted upon by any outside forces (i.e., forces other than those created by springs 70, 72, 74 and 88). For purposes of the invention, it does not matter whether the shock absorbers 56 are connected to bicycle 2 such that the shock absorber rods 94 are connected to bracket 54 or lower fork prong 58, however, it is preferred that each of the shock absorbers be connected in the same way.

In its state of equilibrium, it is preferred that each of the springs 70, 72, 74 and 88 be contiguous with their adjacent bearing(s) or piston head. In this embodiment, spring 70 and return spring 88 are also contiguous with end wall 80 and plug 84, respectively. In the state of equilibrium, return spring 88 can exist in a partially compressed state such that it exerts a force on piston head 90 in the longitudinal direction towards end wall 80. However, in this case, it is preferred that the spring constant of return spring 88 and the extent to which return spring 88 is compressed be such that the force exerted by return spring 88 is not sufficient to cause significant compression of any of the energy absorbing springs 70, 72 and 74. If the spring constant and extent of compression of return spring 88 are such that significant compression occurs in one of the energy absorbing springs 70, 72 and 74 when the shock absorber 56 is in a state of equilibrium, then the compressed energy absorbing spring should be of sufficient length such that it can be subjected to additional compression in response to outside forces acting on the shock absorber.

As previously stated, it is preferred that the energy absorbing springs 70, 72 and 74 possess different spring constants such that they each exhibit different resistances to compression. In this way, the shock absorbing capacity of each spring is different.

To demonstrate the function of shock absorber 56, take the case of a shock absorber wherein spring 70 possesses the smallest innate resistance of the energy absorbing springs and wherein spring 74 possesses the largest innate resistance. Referring to FIG. 4, when bicycle 2 passes over a bump in the road, shock absorber rod 94 is forced further into spring housing 66 first causing compression of energy absorbing spring 70. If the shock caused by the bump in the road is great enough, spring 70 may compress until cylindrical extension 82 of bearing 76 meets opposing cylindrical extension 82 of end wall 80 (see FIG. 4). If the shock is of a sufficient intensity, spring 72 will also begin to compress between bearings 76 and 78 to help absorb the shock. Finally, if the shock is of the most violent kind encountered while riding a bicycle, the heaviest energy absorbing spring 74 will also begin to compress between bearing 78 and piston head 90 to absorb the shock (see FIG. 4).

When rear wheel 6 of bicycle 2 has completely passed over the bump in the road, the shock force which urged shock absorber rod 94 toward end wall 80 has been absorbed into the energy absorbing springs. The energy absorbing springs then expand, forcing rod 94 back to its original position. As rod 94 returns, return spring 88 exerts an opposing force against piston head 90 to prevent backlash of the rod 94. Preferably, return spring 88 is long enough so that it can continue to be contiguous with piston head 90 and plug 84 when the shock absorber is absorbing intense shocks (i.e., when all three of the energy absorbing springs 70, 72 and 74 are compressed by the inward movement of rod 94).

In another preferred embodiment, the lightest energy absorbing spring 70 has a spring constant such that the spring is compressed merely by the force of a rider seated on the bike. In this embodiment springs 72 and 74 are primarily responsible for absorbing shockers caused by bumps in the road. This embodiment provides a bouncy feel to the bicycle seat which is preferred by some riders.

It should be noted that the number of energy absorbing springs and return springs of the shock absorber is not critical and that the shock absorber can contain greater fewer than three energy absorbing springs and greater than one return spring.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A bicycle having an integral shock absorbing suspension comprising:
   a front wheel and a rear wheel arranged in tandem, each wheel having an axle;
   a seat mast having a seat atop thereof and a gear axle housing;
   a lower fork having a pair of prongs radially disposed on opposite sides of said rear wheel and attached at rear ends thereof to said rear wheel axle so as to allow for rotation of said axle and wheel, the front ends of said prongs being rotatably attached to a pivot means of said seat mast so as to allow for angular movements of said fork with respect to said seat mast;
   a pair of shock absorbers radially disposed on opposite sides of said rear wheel, each shock absorber being fixedly attached at one end thereof to said seat mast and at the other end thereof to a lower fork prong whereby the shock absorbers are compressible in response to angular movements of said lower fork toward said seat mast;
   each of said shock absorbers comprising an elongated spring housing having a closed end and a receiving end; a piston rod longitudinally received within said housing through the receiving end thereof, said piston rod having a piston head disposed inside said housing for supporting the piston rod for longitudinal sliding movement in said housing; a plurality of shock absorbing springs longitudinally disposed inside said housing in end to end arrangement between the closed end of said housing and an obverse face of said piston head, said shock absorbing springs being capable of longitudinal compression movement within said housing in response to movement of said piston rod in the direction of the closed end of said housing; and a return spring longitudinally disposed inside said housing between a reverse face of said piston head and a rim around the receiving end of said housing, said return spring being capable of longitudinal expansion movement within said housing in response to movement of said piston head in the direction of the closed end of said housing; wherein the length of said piston rod with respect to said housing is such that a portion thereof extends outside of the receiving end of said housing.

2. A bicycle according to claim 1 wherein each shock absorbing spring is separated from adjacent springs by a bearing which is capable of sliding longitudinal movement therewith within said housing.

3. A bicycle according to claim 1 having at least three shock absorbing springs, each shock absorbing spring being characterized by possessing a different innate resistance to longitudinal compression.

4. A bicycle according to claim 3 wherein the return spring is characterized by possessing an innate resistance to compression which is not greater than the smallest innate resistance to compression possessed by any of the shock absorbing springs.

5. A bicycle according to claim 1 wherein the closed end of said housing, the shock absorbing springs, the piston head, the return spring and the rim around the inner periphery of the receiving end of said housing are contiguous when the shock absorber is in a state of equilibrium when there are no outside forces acting on the shock absorber.

6. A bicycle according to claim 5 wherein said return spring is compressed between said rim and the receiving side face of said piston head in a state of equilibrium when there are no outside forces acting on the shock absorber.

7. A bicycle according to claim 3 wherein the shock absorbing spring possessing the smallest innate resistance to compression is immediately adjacent to the closed end of said housing and the shock absorbing spring possessing the greatest innate resistance to compression is immediately adjacent to the obverse face of the piston head.

8. A bicycle according to claim 2 wherein each bearing has a pair of longitudinal extensions extending in opposite directions and received in adjacent shock absorbing springs for restricting lateral movement thereof.

9. A bicycle according to claim 8 wherein the longitudinal extensions and the spring housing are cylindrical and concentric with the shock absorbing springs.

10. A bicycle according to claim 1 wherein said spring housing includes an inner lining of a material which reduces noise emanating from the inside of the spring housing.

11. A bicycle according to claim 8 wherein said piston rod is coaxially disposed within said return spring for restricting lateral movement of said return spring.

12. A bicycle having an integral shock absorbing suspension comprising:
    a front wheel and a rear wheel arranged in tandem, each wheel having an axle;
    a seat mast having a seat atop thereof and a gear axle housing;
    a lower fork having a pair of prongs radially disposed on opposite sides of said rear wheel and attached at rear ends thereof to said rear wheel axle so as to allow for rotation of said axle and wheel, the front ends of said prongs being rotatably attached to a pivot means of said seat mast so as to allow for angular movements of said fork with respect to said seat mast;
    a pair of shock absorbers radially disposed on opposite sides of said rear wheel, each shock absorber being fixedly attached at one end thereof to said seat mast and at the other end thereof to a lower fork prong whereby the shock absorbers are compressible in response to angular movements of said lower fork toward said seat mast;

each of said shock absorbers comprising:

an elongated casing having a hollow tubular core extending longitudinally from a closed end of the casing to a receiving end of the casing having an inner rim;

a piston rod, longitudinally received in said core of said casing through the receiving end thereof, said piston rod having a connection end disposed to the exterior of said casing and a piston rod head disposed inside said tubular core, and said piston rod being capable of sliding longitudinal movement with said piston rod head within said core;

a first shock absorbing spring coaxially disposed within said core and contiguous with the closed end of said casing, said first shock absorbing spring being capable of longitudinal compression within said core in response to longitudinal movements of said piston rod toward said closed end of said casing;

a second shock absorbing spring coaxially disposed within said core and arranged in end to end fashion with said first shock absorbing spring, said second shock absorbing spring being capable of sliding longitudinal movement and longitudinal compression within said core in response to movements of said piston rod toward said closed end of said casing;

a first annular piston bearing interposed in said core between said first shock absorbing spring and said second shock absorbing spring and being contiguous therewith, said first annular piston bearing being capable of sliding longitudinal movement within said core so as to be an impenetrable yet movable boundary between said first and second shock absorbing springs;

a third shock absorbing spring coaxially disposed within said core and arranged in end to end fashion with said second shock absorbing spring, said third shock absorbing spring being capable of sliding longitudinal movement and longitudinal compression within said core in response to movements of said piston rod toward said closed end of said casing;

a second annular piston bearing interposed in said core between said second and third shock absorbing springs and being contiguous therewith, said second annular piston bearing being capable of sliding longitudinal movement within said core so as to provide an impenetrable yet movable boundary between said second and third shock absorbing springs; and a return spring coaxially disposed within said core in end to end arrangement with said third shock absorbing spring and being capable of longitudinal expansion within said core in response to movements of said piston rod toward said closed end of said casing, said piston rod head being interposed between said return spring and said third shock absorbing spring and being contiguous therewith so as to provide an impenetrable yet movable boundary between said springs, and said return spring being partially compressed between said piston rod head and the inner rim of the receiving end of said casing in a state of equilibrium where said piston rod is stationary with respect to said casing when no outside forces are acting on the shock absorber;

wherein each of the shock absorbing springs is characterized by having a spring constant which is different than the others so as to have a different shock absorbing capacity, and wherein in said state of equilibrium the force of the return spring on the piston rod head is insufficient to cause complete compression of any of the shock absorbing springs.

13. A bicycle according to claim 12 wherein the length of the return spring in such that in a state where an outside force acts on the shock absorber to cause complete compression of at least one shock absorbing spring, the return spring is still partially compressed.

14. A bicycle according to claim 12 wherein the length of the return spring is such that in a state where an outside force acts on the shock absorber to cause complete compression of at least two shock absorbing springs, the return spring is still partially compressed.

15. A bicycle according to claim 12 wherein each bearing has a pair of cylindrical extensions extending in opposite longitudinal directions and coaxially received in adjacent springs for restricting lateral movement of adjacent springs.

16. A bicycle according to claim 15 wherein the closed end wall of said casing has a longitudinal cylindrical extension which is coaxially received within said first shock absorbing spring for restricting lateral movement thereof.

17. A bicycle according to claim 16 wherein said return spring is coaxially positioned around said piston rod such that said piston rod restricts lateral movement of said return spring.

18. A bicycle according to claim 12 further comprising a plug disposed within said core and interposed between the inner rim of the receiving end of said casing and the return spring, said plug having an aperture which receives said piston rod and restricts lateral movement thereof.

19. A bicycle having an integral shock absorbing suspension comprising:

a front wheel and a rear wheel arranged in tandem, each wheel having an axle;

a seat mast having a seat atop thereof and a gear axle housing;

a lower fork having a pair of prongs radially disposed on opposite sides of said rear wheel and attached at rear ends thereof to said rear wheel axle so as to allow for rotation of said axle and wheel, the front ends of said prongs being rotatably attached to a pivot means of said seat mast so as to allow for angular movements of said fork with respect to said seat mast;

a pair of shock absorbers radially disposed on opposite sides of said rear wheel, each shock absorber being fixedly attached at one end thereof to said seat mast and at the other end thereof to a lower fork prong whereby the shock absorbers are compressible in response to angular movements of said lower fork toward said seat mast;

a plurality of pedal gears having a common gear axle, said gear axle being rotatably supported in said gear axle housing;

pedal means for inducing rotation of said gear axle;

a plurality of rear wheel gears coaxially disposed around said rear wheel axle and joined thereto by a means for inducing rotational movement of said rear wheel axle in response to rotational movement of said rear wheel gears;

chain means for coupling rotational movement of said rear wheel gears with rotational movement of said pedal gears;

a front fork having a pair of prongs radially disposed on opposite sides of said front wheel and attached at front ends thereof to said front wheel axle so as to allow for rotation of said axle and wheel;

a frame means for joining said front fork to said seat mast, said front fork being supported for turning movement by said frame means;

handle bar means for turning said front fork for steering said front wheel; and brake means for inducing resistance to rotation of said wheels, each of said shock absorbers comprising:

an elongated casing having a hollow tubular core extending longitudinally from a closed end of the casing to a receiving end of the casing having an inner rim;

a piston rod, longitudinally received in said core of said casing through the receiving end thereof, said piston rod having a connection end disposed to the exterior of said casing and a piston rod head disposed inside said tubular core, and said piston rod being capable of sliding longitudinal movement with said piston rod head within said core;

a first shock absorbing spring coaxially disposed within said core and contiguous with the closed end of said casing, said first shock absorbing spring being capable of longitudinal compression within said core in response to longitudinal movements of said piston rod toward said closed end of said casing;

a second shock absorbing spring coaxially disposed within said core and arranged in end to end fashion with said first shock absorbing spring, said second shock absorbing spring being capable of sliding longitudinal movement and longitudinal compression within said core in response to movements of said piston rod toward said closed end of said casing;

a first annular piston bearing interposed in said core between said first shock absorbing spring and said second shock absorbing spring and being contiguous therewith, said first annular piston bearing being capable of sliding longitudinal movement within said core so as to be an impenetrable yet movable boundary between said first and second shock absorbing springs;

a third shock absorbing spring coaxially disposed within said core and arranged in end to end fashion with said second shock absorbing spring, said third shock absorbing spring being capable of sliding longitudinal movement and longitudinal compression within said core in response to movements of said piston rod toward said closed end of said casing;

a second annular piston bearing interposed in said core between said second and third shock absorbing springs and being contiguous therewith, said second annular piston bearing being capable of sliding longitudinal movement within said core so as to provide an impenetrable yet movable boundary between said second and third shock absorbing springs; and a return spring coaxially disposed within said core in end to end arrangement with said third shock absorbing spring and being capable of longitudinal expansion within said core in response to movements of said piston rod toward said closed end of said casing, said piston rod head being interposed between said return spring and said third shock absorbing spring and being contiguous therewith so as to provide an impenetrable yet movable boundary between said springs, and said return spring being partially compressed between said piston rod head and the inner rim of the receiving end of said casing in a state of equilibrium where said piston rod is stationary with respect to said casing when no outside forces are acting on the shock absorber;

wherein each of the shock absorbing springs is characterized by having a spring constant which is different than the others so as to have a different shock absorbing capacity, and wherein in said state of equilibrium the force of the return spring on the piston rod head is insufficient to cause complete compression of any of the shock absorbing springs.

20. A bicycle according to claim 19 wherein said shock absorbers form angles of 35° to 65° with each of said seat mast and said lower fork prongs and wherein said seat mast forms an angle of 50°–110° with said lower fork.

21. A bicycle according to claim 20 wherein the angles formed between said shock absorbers and each of said seat mast and said lower fork prongs is from 45°–55° and the angle between said seat mast and said lower fork is between 70°–90°.

22. A bicycle according to claim 19 wherein said frame means includes: a top bar fixedly attached at a rear end thereof to said seat mast; a down bar fixedly attached at a rear end thereof to said seat mast; and a hollow head cylinder, joined on its outer face to a front end of each of said down bar and top bar and having received therethrough a handle of said front fork, said handle being capable of turning movement within said head cylinder and being fixedly attached at a top end thereof to said handle bars.

* * * * *